United States Patent
O'Connor et al.

(10) Patent No.: US 12,436,107 B1
(45) Date of Patent: Oct. 7, 2025

(54) LASER ABLATION SYSTEM WITH IN-CHAMBER FIBER OPTIC DETECTION FOR LASER INDUCED BREAKDOWN SPECTROSCOPY

(71) Applicant: Elemental Scientific Lasers, LLC, Omaha, NE (US)

(72) Inventors: Ciaran J. O'Connor, Bozeman, MT (US); Jay N. Wilkins, Belgrade, MT (US); Shane Hilliard, Bozeman, MT (US)

(73) Assignee: Elemental Scientific Lasers, LLC, Omaha, NE (US)

(*) Notice: Subject to any disclaimer, the term of this patent is extended or adjusted under 35 U.S.C. 154(b) by 134 days.

(21) Appl. No.: 18/524,748

(22) Filed: Nov. 30, 2023

Related U.S. Application Data

(60) Provisional application No. 63/385,683, filed on Dec. 1, 2022.

(51) Int. Cl.
*G01J 3/443* (2006.01)
*G01N 21/71* (2006.01)

(52) U.S. Cl.
CPC .. *G01N 21/718* (2013.01); *G01N 2201/06113* (2013.01); *G01N 2201/0826* (2013.01); *G01N 2201/0833* (2013.01)

(58) Field of Classification Search
CPC ....... G01N 21/718; G01N 2201/06113; G01N 2201/0826; G01N 2201/0833; G01J 3/443
See application file for complete search history.

(56) References Cited

U.S. PATENT DOCUMENTS

| | | | | |
|---|---|---|---|---|
| 5,266,532 A * | 11/1993 | Russell | ............... | H10F 77/703 257/E31.13 |
| 5,622,567 A * | 4/1997 | Kojima | ............... | C23C 14/3471 427/596 |
| 6,751,516 B1 * | 6/2004 | Richardson | ........... | B29C 64/153 700/118 |
| 6,967,717 B1 * | 11/2005 | Boss | ............... | B82Y 30/00 356/301 |
| 8,879,064 B2 * | 11/2014 | O'Connor | ............. | G01J 3/0291 356/432 |
| 11,247,295 B1 * | 2/2022 | Bol'shakov | .......... | G01N 21/718 |
| 2012/0099103 A1 * | 4/2012 | Hahn | .................. | G01N 21/718 356/316 |
| 2013/0100453 A1 * | 4/2013 | Harrison | ............... | G01N 21/55 356/445 |
| 2016/0187201 A1 * | 6/2016 | Wang | ................... | G01J 3/443 356/318 |
| 2016/0254133 A1 * | 9/2016 | Lopez-Avila | ......... | H01J 49/161 250/282 |
| 2018/0286643 A1 * | 10/2018 | Tuitje | ................... | G01N 21/31 |

* cited by examiner

*Primary Examiner* — Abdullahi Nur
(74) *Attorney, Agent, or Firm* — Kevin E. West; Advent, LLP

(57) ABSTRACT

Systems and methods for laser induced breakdown spectroscopy using one or more fiber optics within a laser ablation chamber are described. A system embodiment includes, but is not limited to, an ablation chamber defining an interior region configured to hold a sample target for ablation by an ablation beam source to generate a plasma upon ablation; and at least one optical fiber having an end positioned within the interior region adjacent the sample target to receive light emitted from the plasma generation.

20 Claims, 4 Drawing Sheets

LASER ABLATION SYSTEM WITH IN-CHAMBER FIBER OPTIC DETECTION FOR LASER INDUCED BREAKDOWN SPECTROSCOPY

CROSS-REFERENCE TO RELATED APPLICATIONS

The present application claims the benefit of 35 U.S.C. § 119 (e) of U.S. Provisional Application Ser. No. 63/385,683, filed Dec. 1, 2022, and titled "LASER ABLATION SYSTEM WITH IN-CHAMBER FIBER OPTIC BREAKDOWN DETECTION." U.S. Provisional Application Ser. No. 63/385,683 is herein incorporated by reference in its entirety.

BACKGROUND

Laser assisted spectroscopy can be used to analyze the composition of a sample target, such as a solid or liquid target material. Techniques include Laser Ablation Inductively Coupled Plasma Mass Spectrometry (LA-ICPMS) and Laser Ablation Inductively Coupled Plasma Optical Emission Spectrometry (LA-ICP-OES), used to analyze particles/vapors entrained in a carrier gas, and Laser Induced Breakdown Spectroscopy (LIBS), used to analyze emitted light resulting from plasma generation on the sample. For particle analysis, a sample of the target is provided to an analysis system in the form of an aerosol (i.e., a suspension of solid and possibly liquid particles and/or vapor in a carrier gas, such as helium gas). The sample is typically produced by arranging the target within a laser ablation chamber, introducing a flow of a carrier gas within the chamber, and ablating a portion of the target with one or more laser pulses to generate a plume containing particles and/or vapor ejected or otherwise generated from the target, suspended within the carrier gas. Entrained within the flowing carrier gas, the target material is transported to an analysis system via a transport conduit to an inductively coupled plasma (ICP) torch where it is ionized.

SUMMARY

Systems and methods for laser induced breakdown spectroscopy using one or more fiber optics within a laser ablation chamber are described. A system embodiment includes, but is not limited to, an ablation chamber defining a window to allow laser radiation entry in a top surface of the ablation chamber and defining an interior region configured to hold a sample target for ablation by an ablation beam source to generate a plasma upon ablation; cup coupled to the top surface of the ablation chamber, the cup defining an interior volume configured to be positioned above the sample target and within the interior region, a first aperture configured to pass radiation from the ablation beam source, through the window, to the sample target within the ablation chamber, and one or more fiber optic apertures extending through the cup to define one or more channels from an exterior of the ablation chamber to the interior volume of the cup; and one or more optical fibers inserted through respective fiber optic apertures of the one or fiber optic apertures, each of the one or more optical fibers having an end positioned within the interior volume adjacent the sample target to receive light emitted from the plasma generation.

In an aspect, a laser ablation system includes, but is not limited to, an ablation chamber defining a window to allow laser radiation entry in a top surface of the ablation chamber and defining an interior region configured to hold a sample target for ablation by an ablation beam source to generate a plasma upon ablation; and a cup coupled to the top surface of the ablation chamber, the cup configured to support one or more optical fibers to receive light emitted from the plasma generation, the cup defining an interior volume configured to be positioned above the sample target and within the interior region, a first aperture configured to pass radiation from the ablation beam source to the sample target within the ablation chamber, and one or more fiber optic apertures extending through the cup to define one or more channels from an exterior of the ablation chamber to the interior volume of the cup, the one or more fiber optic apertures configured to position an end of an optical fiber within the interior volume.

In an aspect, a method for laser ablation of a sample target includes, but is not limited to, introducing a plurality of optical fibers into a laser ablation system, the laser ablation system including an ablation chamber defining a window to allow laser radiation entry in a top surface of the ablation chamber and defining an interior region configured to hold a sample target for ablation by an ablation beam source to generate a plasma upon ablation; a cup coupled to the top surface of the ablation chamber, the cup defining an interior volume configured to be positioned above the sample target and within the interior region, a first aperture configured to pass radiation from the ablation beam source, through the window, to the sample target within the ablation chamber, and one or more fiber optic apertures extending through the cup to define one or more channels from an exterior of the ablation chamber to the interior volume of the cup; and positioning an end of each of the plurality of optical fibers within the interior volume adjacent the sample target to receive light emitted from the plasma generation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

FIGURES

The Detailed Description is described with reference to the accompanying figures. The use of the same reference numbers in different instances in the description and the figures may indicate similar or identical items.

DETAILED DESCRIPTION

Overview

Figure 1:
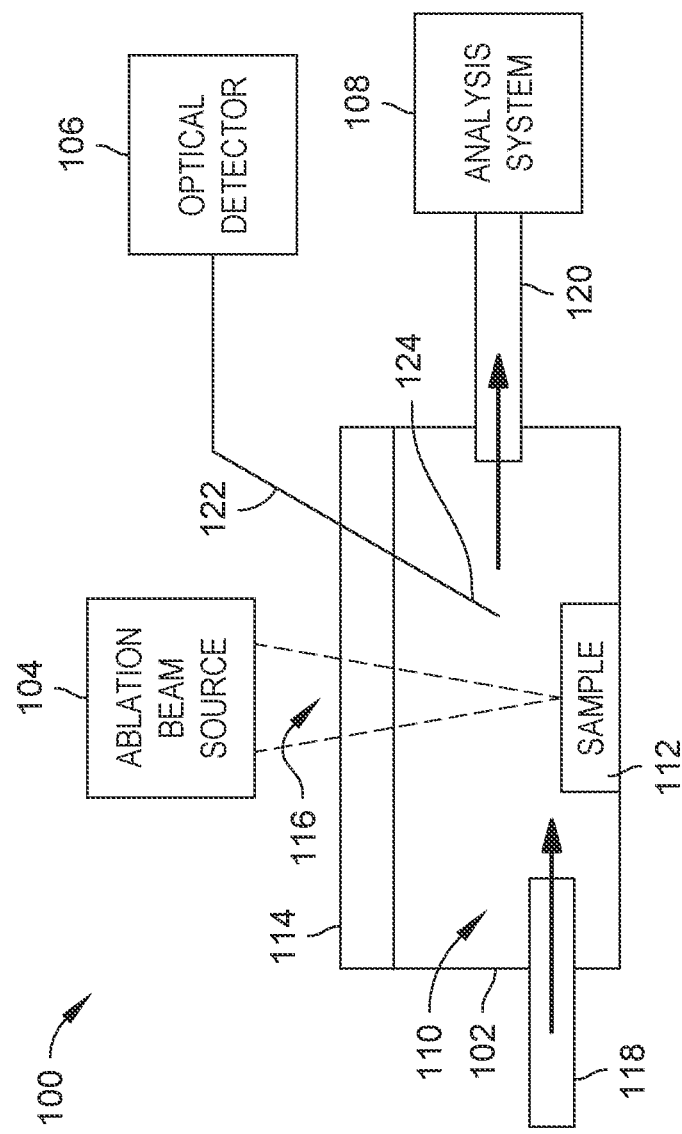
FIG. 1 is a schematic diagram of a laser ablation system in accordance with example implementations of the present disclosure.

Laser ablation systems direct radiation pulses towards a target (e.g., a solid sample, a liquid sample, etc.) to ablate a portion of the target material. Often, the target is held within an ablation chamber that couples with a carrier gas inlet to receive a carrier gas and transfer a plume of particles, aerosol, or vapors resulting from ablation of the target to an analysis system (e.g., ICP-MS, ICP-OES, etc.). A transmission window can separate the source of the radiation from the sample target, where radiation is directed through the transmission window to ablate the target while separating the target from the environment external to the ablation chamber. However, certain chemical species can provide detection challenges for inductively-coupled plasma systems. For instance, atmospheric gases (e.g., hydrogen, nitrogen, oxygen), high ionization potential elements (e.g., fluorine), gases used for ICP analysis systems (e.g., argon), and noble gases (e.g., helium, neon, krypton, xenon, radon) can have poor sensitivity in ICP analytic systems, either through atmospheric interferences or poor ionization.

Laser Induced Breakdown Spectroscopy (LIBS) can utilize a laser ablation chamber to direct a pulsed laser through the transmission window to generate a plasma. Light emitted by the plasma is collected and directed to a spectrometer to detect a chemical-specific spectrum of light. The optical nature of spectral analysis permits the LIBS system to measure components that provide detection challenges for ICP-based analysis systems. However, LIBS systems typically require precise optic systems that utilize lenses, mirrors, and the like to focus and direct the emitted light. For example, such systems can require optic systems positioned exterior the ablation chamber to avoid particulates from fouling the lens, mirrors, etc., which could negatively impact signal sent to the spectrometer. The optic systems receive light emitted through the transmission window (either directly or indirectly through a different optic system) into fiber optics which direct the light to a spectrometer for analysis. Such optic systems can require adjustments and other maintenance to ensure the light channeled into the fiber optics is not diffracted, interrupted, diluted, or the like, while potentially introducing error to spectrometric analyses based on misalignment, fouling, and other issues.

Accordingly, systems and methods for laser induced breakdown spectroscopy using one or more fiber optics within a laser ablation chamber are described having no intervening focusing optic systems employed between an end of the optical fiber and the source of the light emitted by the target sample. In aspects, a system includes a cup configured to mount to a top surface of a laser ablation chamber. The cup is configured to support a transmission window and one or more fiber support structures configured to hold optical fibers within an interior of the laser ablation chamber (e.g., adjacent a target within the laser ablation chamber) to receive light emitted from plasma formed by ablation of the target and direct the light externally from the chamber to one or more spectrometers. An example fiber support structure introduces an end of the optical fiber through an aperture in the cup to position the end adjacent to the target without any intervening focusing optic systems positioned between the end and the target to receive the light emitted from plasma formed by ablation of the target directly into the end of the optical fiber.

Example Implementations

Referring to FIGS. 1-4, a laser ablation system is shown for facilitating laser induced breakdown spectroscopy ("system 100") in accordance with an example implementation of the present disclosure. The system 100 is shown generally including an ablation chamber 102, an ablation beam source 104, an optical detector 106, and an analysis system 108. In various aspects, the analysis system 108 can be omitted, such as where ICP-based analysis is not desired.

Figure 2:
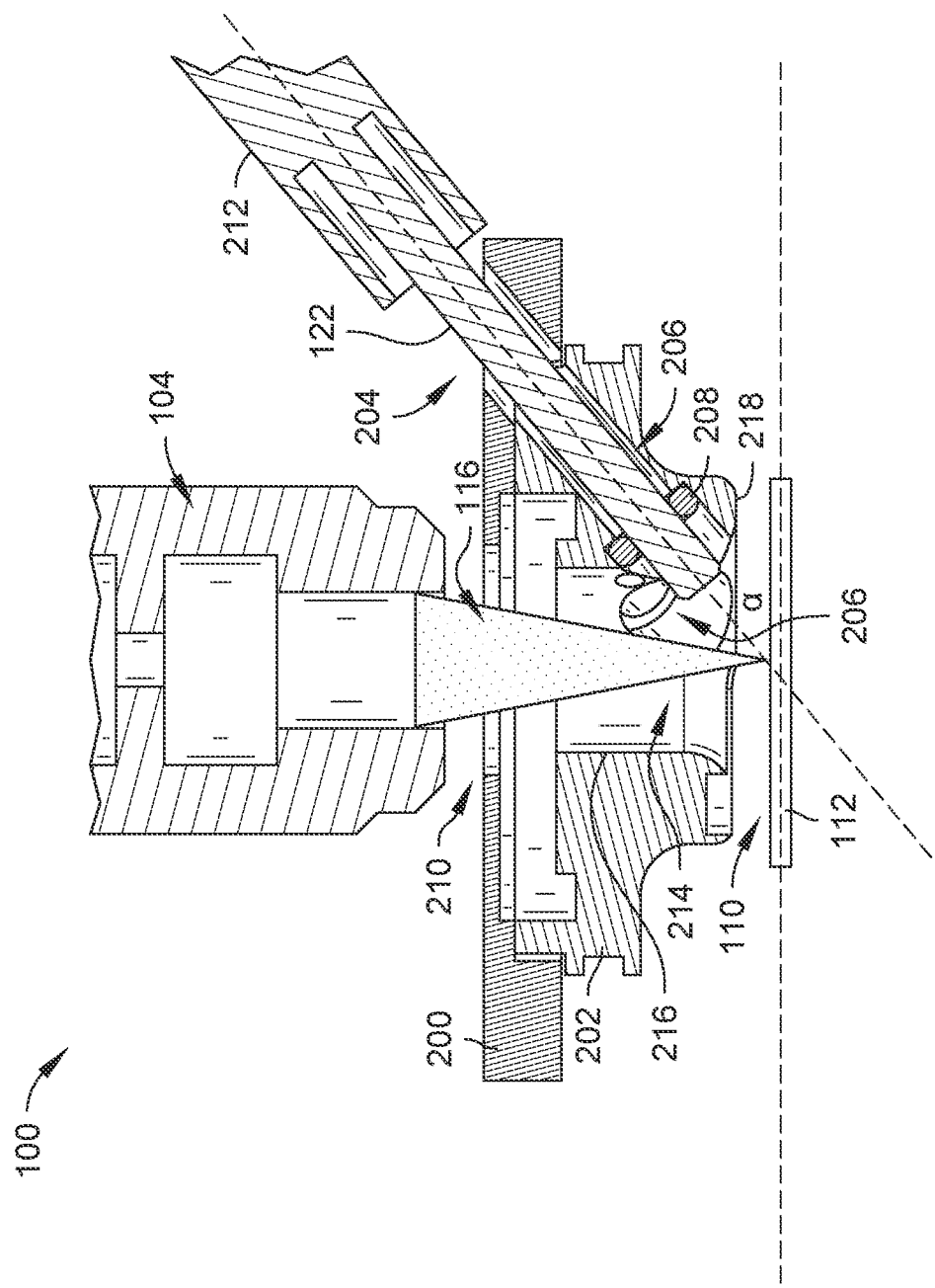
FIG. 2 is a partial cross section of a laser ablation system including an optical fiber end positioned within an ablation chamber with no intervening optical elements in accordance with example implementations of the present disclosure.
Figure 3:
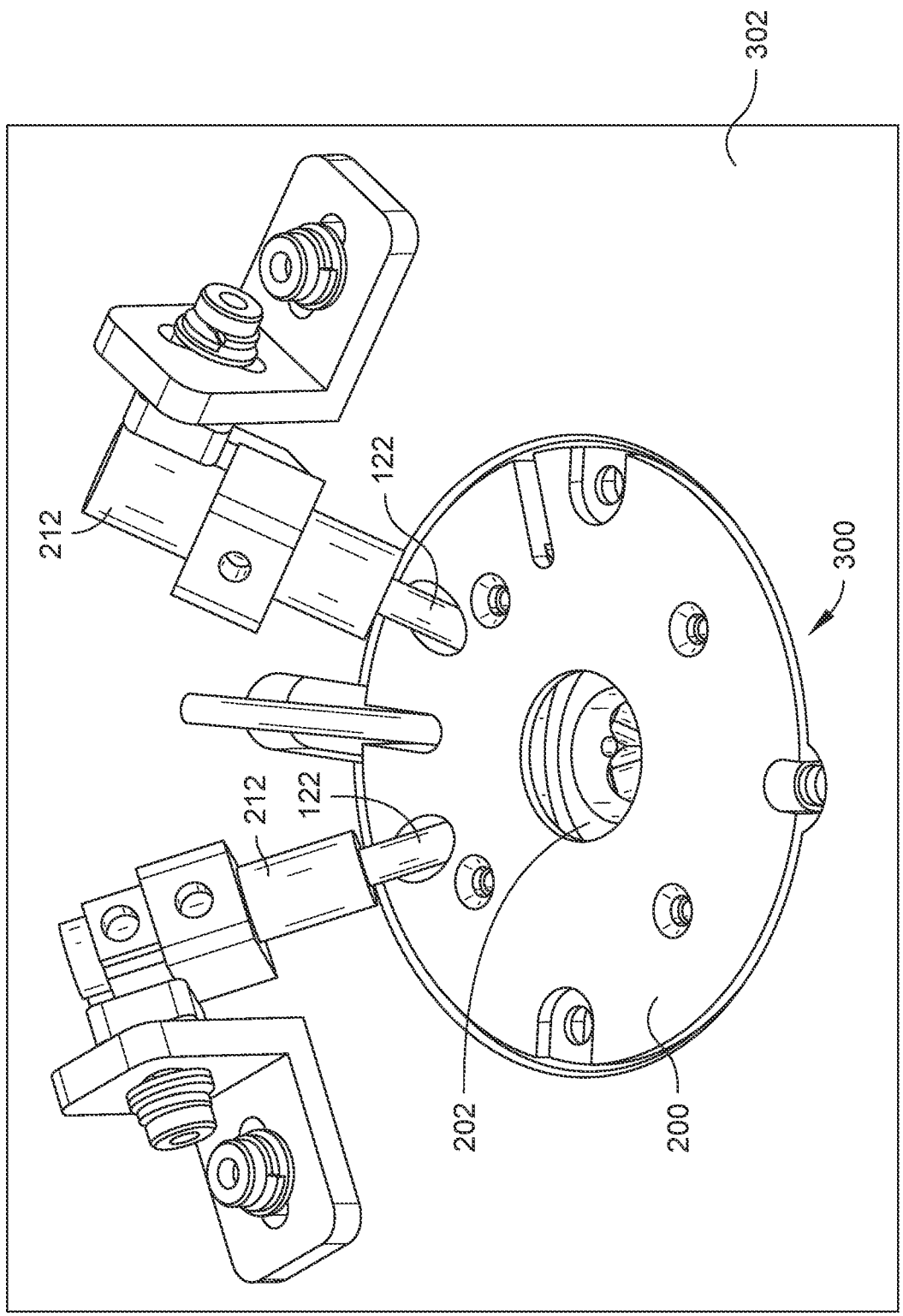
FIG. 3 is a partial isometric view of the laser ablation system of FIG. 2, illustrating a plurality of mounts to position ends of optical fibers within the ablation chamber in accordance with example implementations of the present disclosure.

The ablation chamber 102 defines an interior region 110 to accommodate a sample target 112 within the interior region 110. The ablation chamber 102 also includes a transmission window 114 configured to transmit radiation pulses 116 from the ablation beam source 104 into the interior region 110 and onto the sample target 112. While the transmission window 114 is shown covering substantially all of the top portion of the ablation chamber 102, the system 100 is not limited to such a configuration. For example, the ablation chamber 102 can include a chamber top portion into which or against which the transmission window 114 is secured, providing a subset of the material of the top of the ablation chamber 102 (e.g., as shown in FIGS. 2 and 3).

The ablation chamber 102 is also shown including a carrier gas inlet 118 coupled with a carrier gas source to introduce a carrier gas (e.g., helium, argon, etc., or combinations thereof) into the interior region 110. The radiation pulses 116 provide a fluence sufficient to ablate a portion of the sample target 112, thereby producing an aerosol plume (also referred to as an "aerosol," a "plume", a "plume of aerosol", or the like) including material ablated from the sample target 112 entrained in the carrier gas from the carrier gas inlet 118. An aerosol transport conduit 120 is coupled with the interior region 110 and is configured to receive at least a portion of the aerosol plume and transport the aerosol plume to the analysis system 108. The analysis system 108 can include, but is not limited to, an inductively-coupled plasma instrument, such as an ICP-MS, ICP-OES, etc.

During operation of the system 100, the ablation beam source 104 generates and transmits the radiation pulses 116 through the transmission window 114 onto the sample target 112 which in turn generates a plasma on or above the sample target 112. Light emitted by the plasma is collected and directed to the optical detector 106 to detect the chemical-specific spectrum of light. For example, the system 100 is shown with an optical fiber 122 having an end 124 positioned within the interior region 110 adjacent the sample target 112 to collect light emitted by the plasma. The optical fiber 122 passes from the ablation chamber 102 (e.g., shown through the top portion of the ablation chamber 102 in FIG. 1) to the optical detector 106 for analysis of the resultant light. While the optical fiber 122 and the optical detector 106 are shown diagrammatically, the system 100 can include a single optical fiber 122 and a single optical detector 106, multiple optical fibers 122 and multiple optical detectors 106, multiple optical fibers 122 and a single optical detector 106, a single optical fiber 122 branching to multiple optical detectors 106, or the like, without departing from the scope of the instant disclosure. For example, the optical fiber 122 can include a bundle of individual optical fibers, each having an end positioned adjacent the sample target 112 to collect light emitted by the plasma and direct the light through the individual fibers to a plurality of optical detectors (e.g., different types of optical detectors, multiple versions of the same type of optical detectors, or combinations thereof). The optical detector 106 can include one or more of a charged coupled device (CCD) camera, a multi-channel CCD, an intensified CCD (ICCD), or the like.

In implementations, the end 124 of the optical fiber 122 directly receives the light emitted by the plasma, with no intervening focusing optical devices or systems. For example, no lens or mirrors interact with the light prior to introduction to the end 124 of the optical fiber 122.

An example configuration of the optical fiber 122 is shown in FIGS. 2 and 3. The ablation chamber 102 is shown including a mounting plate 200 forming at least a portion of the top surface of the ablation chamber 102. For example, the mounting plate 200 can be inserted at least partially through an aperture 300 formed in a chamber top 302, as shown in FIG. 3, to form the top surface of the ablation chamber 102. The mounting plate 200 couples to a cup 202 positioned at least partially beneath the mounting plate 200 into the interior region 110 of the ablation chamber 102. Alternatively or additionally, the mounting plate 200 and the cup 202 can be arranged to extend the same distance into the interior region 110 of the ablation chamber 100.

The mounting plate 200 and the cup 202 each define one or apertures 204 and 206, respectively, that align to form one or more channels to receive the optical fiber 122 to extend the optical fiber 122 through the mounting plate 200 and the cup 202 to position the end 124 of the optical fiber 122 adjacent the sample target 112 within the interior region 110. Alternatively or additionally, the chamber top 302 can define one or more apertures to align with the apertures 204 in the mounting plate 200 and/or apertures 206 in the cup 202. In implementations, an example of which is shown in FIG. 2, the cup 202 defines an interior volume 214 into which the end 124 of the optical fiber 122 can be positioned during ablation of the sample target 112. For instance, the apertures 206 of the cup 202 can be formed through a sidewall 216 of the cup 202 to open into the interior volume 214 to permit the end 124 of the optical fiber 122 to terminate within the interior volume 214 above the sample target 112 within the interior region 110. For example, the sample target 112 can be positioned outside the interior volume 214 (e.g., beneath the interior volume 214 within the interior region 110). In implementations, the interior volume 214 has a volume less than the volume of the interior region 110. Alternatively or additionally, the chamber top 302 and/or the mounting plate 200 can define apertures that permit one or more optical fibers to be inserted through the top of the ablation chamber 102 directly into the interior volume 214 (e.g., bypassing apertures 206 of the cup 202).

In implementations, one or more of the optical fibers 122 can have the end 124 extend beneath a terminal bottom surface 218 to position the end 124 closer to the sample target 112 than within the interior volume 214 (e.g., to have the optical fiber 122 extend through the interior volume 214 to position the end 124 within the interior volume 214). The cup 202 can include one or more seals 208 (e.g., shown as an O-ring seal) to provide a gas-tight interface between the optical fiber 122 and the apertures 204, 206, which can prevent passage of the aerosol plume through the cup 202. In implementations, the mounting plate 200 defines an aperture 210 to receive the transmission window 110 to seal the ablation chamber 102 from the external environment.

The system 100 can include one or more fiber mounts 212 to secure the optical fiber 122 relative to the ablation chamber 102. For example, individual fiber mounts 212 are shown in FIG. 3 to angle the optical fibers 122 through the mounting plate 200 and cup 202 to introduce the end 124 of each optical fiber 122 adjacent to the sample target 112 within the interior region 110, such as within the interior volume 214, beneath the terminal bottom surface 218, or the like. As shown in FIG. 2, the fiber mount 212 positions the end 124 of the optical fiber 122 adjacent to the sample target 112 (e.g., within the interior volume 214) without any intervening optical devices present therebetween (no lens, mirrors, diffraction elements, focusing elements, or the like positioned between the sample target 112 and the end 124). In implementations, the system 100 positions the end 124 of the optical fiber 122 within the interior region 110 at a displacement from about 5 mm to about 20 mm from the plasma formed on the sample target 112. For example, the fiber mount 212 can secure the end 124 of the optical fiber 122 from about 7 to about 10 mm from the sample target 112 within the interior volume 214 without any intervening focusing optical devices present therebetween.

In implementations, the optical fibers 122 extend into the ablation chamber 102 at an angle from about 80 degrees to about 20 degrees from the plane of the sample target 112 (e.g., shown as a in FIG. 2) to place the end 124 of the optical fiber 122 adjacent to the sample target 112 without interfering with passage of the radiation pulses 116 through the transmission window 110 to the sample target 112. For example, the apertures 204 and 206 can be formed at a non-normal angle to facilitate introduction of the optical fibers 122 offset from the sample target 112 and the radiation pulses 116. While the fiber mounts 212 are shown in FIG. 3 being secured to the chamber top 302, the system 100 is not limited to such configuration, where the system can include additional or alternative mounting configurations for the fiber mounts, such as, for example, mounted to the mounting plate 200, formed integrally with the mounting plate 200, formed integrally with the chamber top 302, or combinations thereof.

Figure 4:
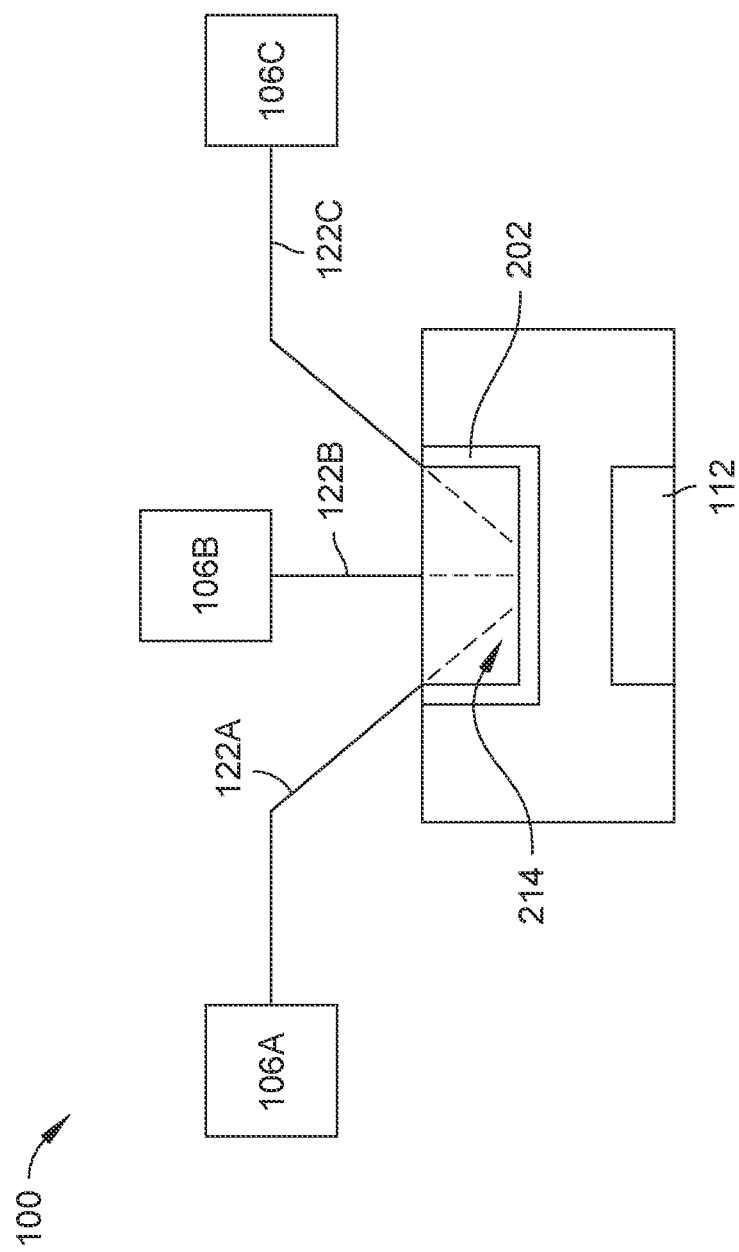
FIG. 4 is a schematic diagram of a laser ablation system supporting multiple optical fibers to transfer light from ablation of a target sample to multiple optical detectors in accordance with example implementations of the present disclosure.

The system 100 can facilitate collection of light through multiple optical fibers 122 supported by a single cup 202 and/or mounting plate 200, which can provide improved signal quality (e.g., more sensitivity) for analysis by one or more optical detectors 106 as compared to a single optical fiber that branches into multiple ends configured to transfer light received from the target sample through a single end to multiple optical detectors. For example, the system 100 is shown in FIG. 4 with the cup 202 supporting three optical fibers (122A, 122B, 122C) having ends within the cup 202 (e.g., within interior volume 214) to each receive light emitted from plasma formation during ablation of the target sample 112 without intervening optical devices therebetween used to focus light into the optical fiber ends. Each of the optical fibers includes only two ends (e.g., a first end within the interior volume 214 and a second end coupled with an optical detector). The optical fibers can each receive light emitted from plasma formation during ablation of the target sample 112 and provide the full amount of light received to an individual optical detector, without substantially reducing, diluting, or splitting the amount of light between optical fiber branches, lens, or the like. While three optical fibers are shown, the system 100 is not limited to three optical fibers and can include fewer than three optical fibers (e.g., two fibers, one fiber) or more than three optical fibers (e.g., four fibers, five fibers, six fibers, seven fibers, eight fibers and so forth) without departing from the scope of the present disclosure, where the number of fibers can depend on characteristics such as a size of the fibers, a size of the cup 202, a size of the ablation chamber 102, a number of analytes of interest to be test, or the like.

FIG. 4 shows each of the optical fibers optically coupled with individual optical detectors, where the optical fiber 122A is optically coupled with the optical detector 106A, optical fiber 122B is optically coupled with the optical detector 106B, and optical fiber 122C is optically coupled with the optical detector 106C. The cup 202 introduces each of the optical fibers 122A, 122B, and 122C at different positions along the cup 202, such as being provided through individual apertures 206 to individually direct the ends 124 of each of the optical fibers 122A, 122B, and 122C into the interior volume 214 spaced apart from one another. One or more of the optical detectors 106A, 106B, 106C can be specifically tuned to measure specific analytes that might be present in the target sample. For example, optical detector 106A can be a spectrometer optimized to detect and measure fluorine (e.g., such as by including a photon multiplier tube (PMT)), whereas optical detector 106B can be a spectrometer optimized to detect a different chemical element or species, and optical detector 106C can be a spectrometer configured to detect an array of chemical elements or species (e.g., without being specifically tuned to any individual chemical element or species).

In implementations, the cup 202 is removably coupled to the ablation chamber 102 to permit a separate cup to be installed, where the separate cup can be configured for LA-ICP analysis. Thus the system 100 can facilitate LIBS analysis and LA-ICP analysis to provide analysis conditions within the interior region 110 that provide signal stability and analysis reproducibility for each analysis type, dependent on the type of cup installed.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A laser ablation system, comprising:
an ablation chamber defining a window in a top surface of the ablation chamber and defining an interior region configured to hold a sample target for ablation by an ablation beam source to generate a plasma upon ablation;
a cup coupled to the top surface of the ablation chamber, the cup defining
an interior volume configured to be positioned above the sample target and within the interior region,
a first aperture configured to pass radiation from the ablation beam source, through the window, to the sample target within the ablation chamber, and
one or more fiber optic apertures extending through the cup to define one or more channels from an exterior of the ablation chamber to the interior volume of the cup; and
one or more optical fibers inserted through respective fiber optic apertures of the one or fiber optic apertures, each of the one or more optical fibers having an end positioned within the interior volume adjacent the sample target to receive light emitted from the plasma generation.

2. The laser ablation system of claim 1, wherein the system includes no intervening focusing optic device between the end of each optical fiber and the sample target.

3. The laser ablation system of claim 1, further comprising one or more optical detectors optically coupled with the one or more optical fibers to receive the light received by the one or more optical fibers for detection of one or more chemical elements associated with the light.

4. The laser ablation system of claim 3, wherein the one or more optical fibers include at least a first optical fiber and a second optical fiber, the first optical fiber optically coupled with a first optical detector, the second optical fiber optically coupled with a second optical detector, wherein one of the first optical detector or the second optical detector is a spectrometer optimized to detect and measure an individual chemical element.

5. The laser ablation system of claim 4, wherein the second optical detector is a spectrometer optimized to detect and measure fluorine.

6. The laser ablation system of claim 1, wherein interior volume is less than a volume of the interior region.

7. The laser ablation system of claim 1, wherein each of the one or more optical fibers includes only two optical fiber ends configured to pass light therethrough.

8. The laser ablation system of claim 1, wherein the one or more fiber optic apertures are formed through a sidewall of the cup forming the interior volume.

9. The laser ablation system of claim 1, wherein the end of each of the one or more optical fibers is positioned within the interior volume above a terminal bottom surface of the cup.

10. The laser ablation system of claim 1, further comprising one or more fiber mounts configured to secure the one or more optical fibers relative to the ablation chamber.

11. The laser ablation system of claim 1, wherein the one or more channels are positioned from about 80 degrees to about 20 degrees from a horizontal plane.

12. A laser ablation system, comprising:
an ablation chamber defining a window in a top surface of the ablation chamber and defining an interior region configured to hold a sample target for ablation by an ablation beam source to generate a plasma upon ablation; and
a cup coupled to the top surface of the ablation chamber, the cup configured to support one or more optical fibers to receive light emitted from the plasma generation, the cup defining
an interior volume configured to be positioned above the sample target and within the interior region,
a first aperture configured to pass radiation from the ablation beam source, through the window, to the sample target within the ablation chamber, and
one or more fiber optic apertures extending through the cup to define one or more channels from an exterior of the ablation chamber to the interior volume of the cup, the one or more fiber optic apertures configured to position an end of an optical fiber within the interior volume.

13. The laser ablation system of claim 12, further comprising one or more optical detectors configured to optically coupled with the one or more optical fibers to receive the light received by the one or more optical fibers for detection of one or more chemical elements associated with the light.

14. The laser ablation system of claim 13, wherein at least one of the one or more optical detectors is a spectrometer optimized to detect and measure an individual chemical element.

15. The laser ablation system of claim 12, wherein interior volume is less than a volume of the interior region.

16. The laser ablation system of claim 12, wherein the one or more fiber optic apertures are formed through a sidewall of the cup forming the interior volume.

17. The laser ablation system of claim 12, wherein the cup includes a terminal bottom surface to define the interior volume above the sample target.

18. The laser ablation system of claim 12, further comprising one or more fiber mounts configured to hold and secure the one or more optical fibers relative to the ablation chamber.

19. The laser ablation system of claim 12, wherein the one or more channels are positioned from about 80 degrees to about 20 degrees from a horizontal plane.

20. A method for laser ablation of a sample target, comprising:
  introducing a plurality of optical fibers into a laser ablation system, the laser ablation system including
    an ablation chamber defining a window in a top surface of the ablation chamber and defining an interior region configured to hold a sample target for ablation by an ablation beam source to generate a plasma upon ablation;
    a cup coupled to the top surface of the ablation chamber, the cup defining
      an interior volume configured to be positioned above the sample target and within the interior region,
      a first aperture configured to pass radiation from the ablation beam source, through the window, to the sample target within the ablation chamber, and
      one or more fiber optic apertures extending through the cup to define one or more channels from an exterior of the ablation chamber to the interior volume of the cup; and
  positioning an end of each of the plurality of optical fibers within the interior volume adjacent the sample target to receive light emitted from the plasma generation.

\* \* \* \* \*